US007747158B2

(12) United States Patent
Ueda

(10) Patent No.: US 7,747,158 B2
(45) Date of Patent: Jun. 29, 2010

(54) PHOTOGRAPHING APPARATUS AND FOCUSING CONTROL METHOD

(75) Inventor: Tooru Ueda, Asaka (JP)

(73) Assignee: Fujifilm Corporation, Tokyo (JP)

( * ) Notice: Subject to any disclaimer, the term of this patent is extended or adjusted under 35 U.S.C. 154(b) by 186 days.

(21) Appl. No.: 12/010,300

(22) Filed: Jan. 23, 2008

(65) Prior Publication Data
US 2008/0205870 A1 Aug. 28, 2008

(30) Foreign Application Priority Data
Jan. 24, 2007 (JP) ............................. 2007-014265

(51) Int. Cl.
G03B 3/00 (2006.01)
G03B 13/00 (2006.01)
G03B 17/00 (2006.01)
H04N 5/232 (2006.01)
G06K 9/00 (2006.01)

(52) U.S. Cl. ................ 396/125; 396/263; 348/345; 348/348; 348/349; 382/118

(58) Field of Classification Search ................ 396/125, 396/263
See application file for complete search history.

(56) References Cited
U.S. PATENT DOCUMENTS
7,298,412 B2 * 11/2007 Sannoh et al. .............. 348/348

2008/0158409 A1 * 7/2008 Gotanda ..................... 348/348
2009/0009651 A1 * 1/2009 Takayanagi ................. 348/345
2009/0073304 A1 * 3/2009 Kumagai et al. ............ 348/345
2009/0213263 A1 * 8/2009 Watanabe ................... 348/349

FOREIGN PATENT DOCUMENTS
JP 7-154669 A 6/1995
JP 2007-208922 * 8/2007

OTHER PUBLICATIONS
Machine English translation of JP 2007-208922, 18 pages, Aug. 16, 2007.*

* cited by examiner

Primary Examiner—Melissa J Koval
(74) Attorney, Agent, or Firm—Birch, Stewart, Kolasch & Birch, LLP

(57) ABSTRACT

A photographing apparatus comprises: a photographing device which takes an image of a subject; a focusing control device which controls the focusing status of the photographing device in response to an input of a focusing instruction; a focusing judgment device which, upon an input of the photographing instruction after the input of the focusing instruction, judges whether or not a focus position at the time of the input of the focusing instruction is optimum; and a photographing control device which controls to execute photographing using the focus position as it is if the focus position at the time of the input of the focusing instruction is judged to be optimum, and controls to execute photographing after performing focusing control again if the focus position is judged to be not optimum.

2 Claims, 8 Drawing Sheets

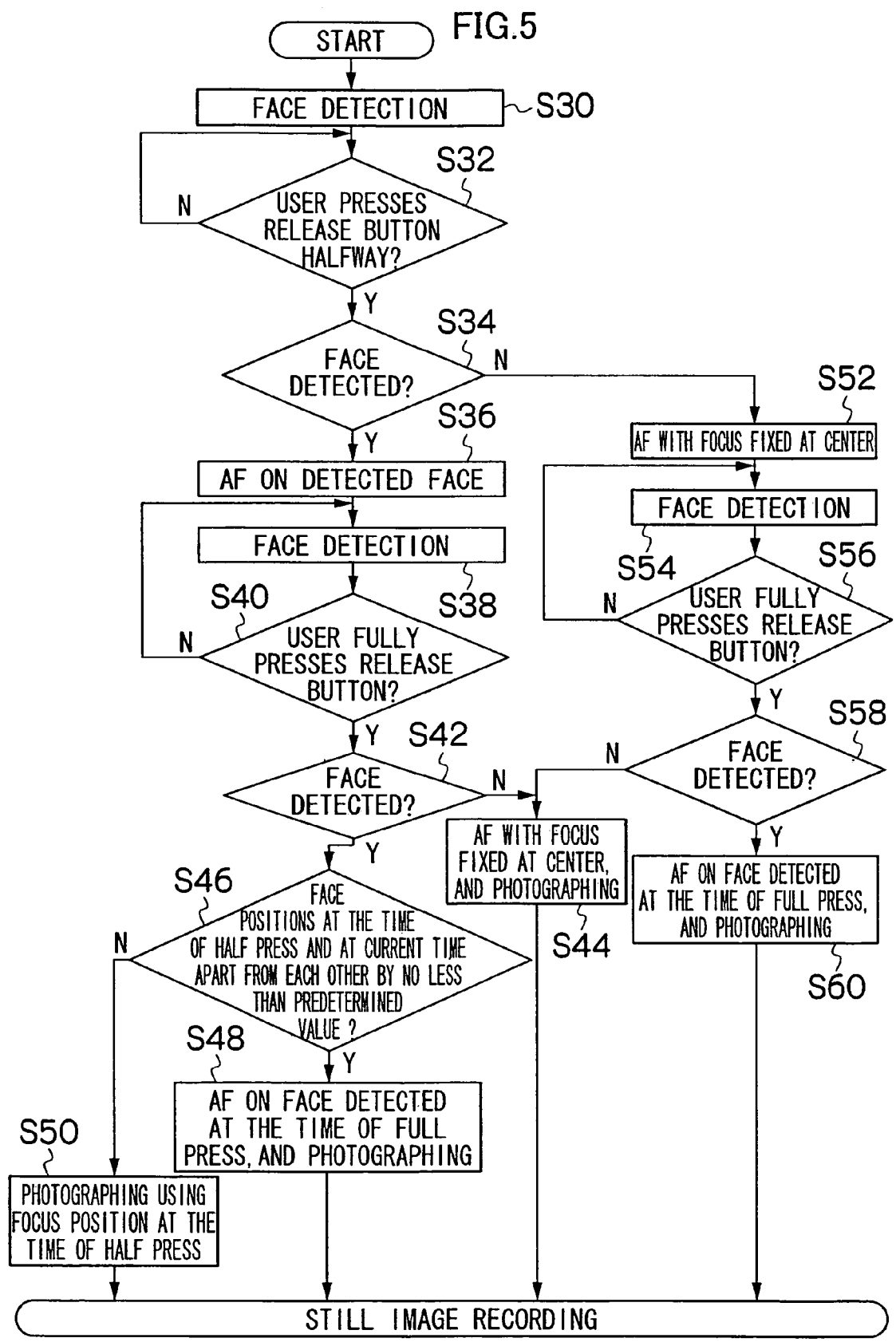

PHOTOGRAPHING APPARATUS AND FOCUSING CONTROL METHOD

BACKGROUND OF THE INVENTION

1. Field of the Invention

The present invention relates to a photographing apparatus and a focusing control method, and specifically relates to a photographing apparatus having an automatic focus adjustment (AF control) function and a focusing control method.

2. Description of the Related Art

Japanese Patent Application Laid-Open No. 7-154669 discloses an automatic focus adjustment device employed in a still video camera, etc., the device comprising: an autocorrelation method-focusing device, and a hill climbing-method focusing device, the device, when a change in a subject after focusing is small, performing hill climbing-method focusing control, which has high focusing precision, and when a change in a subject after focusing is large, performing high-speed focusing control using the autocorrelation method, and then performing hill climbing-method focusing control to follow the change in the subject after focusing.

Conventionally, cameras configured so that AF control is performed for a subject in an AF area to be brought into focus when a focusing instruction is input, and after the AF control, an instruction to execute photographing and recording (photographing instruction) is input are known. Such a camera has a problem in that when a subject or the camera is moved during the time from a focusing instruction until a photographing instruction, the subject located within the AF area at the time of the input of the focusing instruction would fall outside the AF area at the time of the input of the photographing instruction, and the subject would become out of focus in an image actually photographed.

Japanese Patent Application Laid-Open No. 7-154669 above enables to follow a change in a subject at high speed using a combination of two types of focusing devices. However, the combination of two-types of focusing devices has a problem in that AF control processing becomes complicated. Also, Japanese Patent Application Laid-Open No. 7-154669 is not configured to focus on a particular subject, so it is different in AF control method from the present invention.

SUMMARY OF THE INVENTION

The present invention has been made in view of the above circumstances, and an object of the present invention is to provide a photographing apparatus and a focusing control method that enable performing photographing so as to focus on a particular subject, the photographing apparatus being configured so that AF control is performed at the time of the input of a focusing instruction so as to focus on a subject within an AF area, and after the AF control, an instruction to execute photographing and recording an image (photographing instruction) is input.

In order to achieve the above object, a photographing apparatus according to a first aspect of the present invention comprises: a photographing device which takes an image of a subject; a focusing instruction device for inputting a focusing instruction; a focusing control device which controls the focusing status of the photographing device in response to an input of the focusing instruction; a photographing instruction device for inputting a photographing instruction to the photographing device after the input of the focusing instruction; a focusing judgment device which, upon an input of the photographing instruction, judges whether or not a focus position at the time of the input of the focusing instruction is optimum; and a photographing control device which controls to execute photographing using the focus position as it is if the focus position is judged to be optimum, and controls to execute photographing after performing focusing control again if the focus position is judged to be not optimum.

According to the first aspect of the present invention, if a particular subject moves after being brought into focus at the time of the input of a focusing instruction, it is possible to perform photographing after performing AF control so that the particular subject is in focus at the time of the input of the photographing instruction.

In relation to the photographing apparatus according to the first aspect of the present invention, a second aspect of the present invention provides: the focusing judgment device judges the focus position at the time of the input of the focusing instruction to be not optimum if at least either the brightnesses or field angles of images taken by the photographing device at the time of the input of the focusing instruction and at the time of the input of the photographing instruction are different from each other by no less than a predetermined value.

A photographing apparatus according to a third aspect of the present invention comprises: a photographing device which takes an image of a subject; a face detection device which detects a face region including a face of the subject from the image taken by the photographing device; a focusing instruction device for inputting a focusing instruction; a focusing control device which, upon an input of the focusing instruction, performs focusing control to focus on the face in the face region detected by the face detection device; a photographing instruction device for inputting a photographing instruction to the photographing device after the input of the focusing instruction; a face position judgment device which judges whether or not a distance between a face region at the time of the input of the focusing instruction and a face region at the time of an input of the photographing instruction is no less than a predetermined value, the face regions are detected by the face detection device; and a photographing control device which controls to execute photographing using a focus position at the time of the input of the focusing instruction as it is if the distance is judged to be less than the predetermined value, and controls to execute photographing after performing focusing control again if the distance is judged to be no less than the predetermined value.

According to the third aspect of the present invention, when performing focusing control so as to focus on a face of a subject, if the face moves after the input of a focusing instruction, photographing can be performed after performing AF control so that the face is in focus at the time of the input of a photographing instruction.

A photographing apparatus according to a fourth aspect of the present invention comprises: a photographing device which takes an image of a subject; a face detection device which detects a face region including a face of the subject from the image taken by the photographing device; a focusing instruction device for inputting a focusing instruction; a focusing control device which, upon the input of the focusing instruction, performs focusing control to focus on the face in the face region detected by the face detection device; a photographing instruction device for inputting a photographing instruction to the photographing device after the input of the focusing instruction; a face size judgment device which judges whether or not a difference between a size of a face region at the time of the input of the focusing instruction and a size of a face region at the time of an input of the photographing instruction is no less than a predetermined value, the face regions are detected by the face detection device; and a photographing control device which controls to execute photographing using a focus position at the time of the input of the focusing instruction as it is if the difference is judged to be less than the predetermined value, and controls to execute photographing after performing focusing control again if the difference is judged to be no less than the predetermined value.

According to the fourth aspect of the present invention, when performing focusing control so as to focus on a face of a subject, if the face moves and its distance to a camera 10 is thereby changed after the input of a focusing instruction, photographing can be performed after performing AF control so that the face is in focus at the time of the input of the photographing instruction.

A focusing control method according to a fifth aspect of the present invention comprises: an image-taking step of taking an image of a subject; a focusing instruction step for inputting a focusing instruction; a focusing control step of controlling the focusing status in response to an input of the focusing instruction; a photographing instruction step for inputting a photographing instruction after the input of the focusing instruction; a focusing judgment step of, upon an input of the photographing instruction, judging whether or not a focus position at the time of the input of the focusing instruction is optimum; and a photographing control step of executing photographing using the focus position at the time of the input of the focusing instruction as it is if the focus position at the time of the input of the focusing instruction is judged to be optimum, and executing photographing after performing focusing control again if the focus position at the time of the input of the focusing instruction is judged to be not optimum.

A focusing control method according to a sixth aspect of the present invention comprises: a focusing instruction step for inputting a focusing instruction; a first face detection step of, upon an input of the focusing instruction, detecting a first face region including a face of a subject from an image taken by an image taking device at the time; a focusing control step of, upon the input of the focusing instruction, performing focusing control to focus on the face in the first face region detected by the first face detection step; a photographing instruction step for inputting a photographing instruction after the input of the focusing instruction; a second face detection step of, upon an input of the photographing instruction, detecting a second face region including a face of the subject from an image taken by the image taking device at the time; a face position judgment step of judging whether or not a distance between the first face region and the second face region is no less than a predetermined value; and a photographing control step of executing photographing using a focus position at the time of the input of the focusing instruction as it is if the distance is judged to be less than the predetermined value, and executing photographing after performing focusing control again if the distance is judged to be no less than the predetermined value.

A focusing control method according to a seventh aspect of the present invention comprises: a focusing instruction step for inputting a focusing instruction; a first face detection step of, upon an input of the focusing instruction, detecting a first face region including a face of a subject from an image taken by an image taking device at the time; a focusing control step of, upon the input of the focusing instruction, performing focusing control to focus on the face in the first face region detected by the first face detection step; a photographing instruction step for inputting a photographing instruction after the input of the focusing instruction; a second face detection step of, upon an input of the photographing instruction, detecting a second face region including a face of the subject from an image taken by the image taking device at the time; a face size judgment step of, upon the input of the photographing instruction, judging whether or not a difference between a size of the first face region and a size of the second face region is no less than a predetermined value; and a photographing control step of executing photographing using a focus position at the time of the input of the focusing instruction as it is if the difference is judged to be less than the predetermined value, and executing photographing after performing focusing control again if the difference is judged to be no less than the predetermined value.

According to the aspects of the present invention, if a particular subject (for example, a human face, an animal, a car or a subject previously registered in the photographing apparatus, etc.) moves after being brought into focus at the time of the input of a focusing instruction, it is possible to perform photographing after performing AF control so that the particular subject is in focus at the time of the input of a photographing instruction.

BRIEF DESCRIPTION OF THE DRAWINGS

FIG. 5 is a flowchart illustrating a processing flow of a CPU during AF control according to the second embodiment of the present invention;

DETAILED DESCRIPTION OF THE PREFERRED EMBODIMENTS

Hereinafter, preferred embodiments of a photographing apparatus and focusing control method according to the present invention are described with reference to the attached drawings.

First Embodiment

Figure 2:
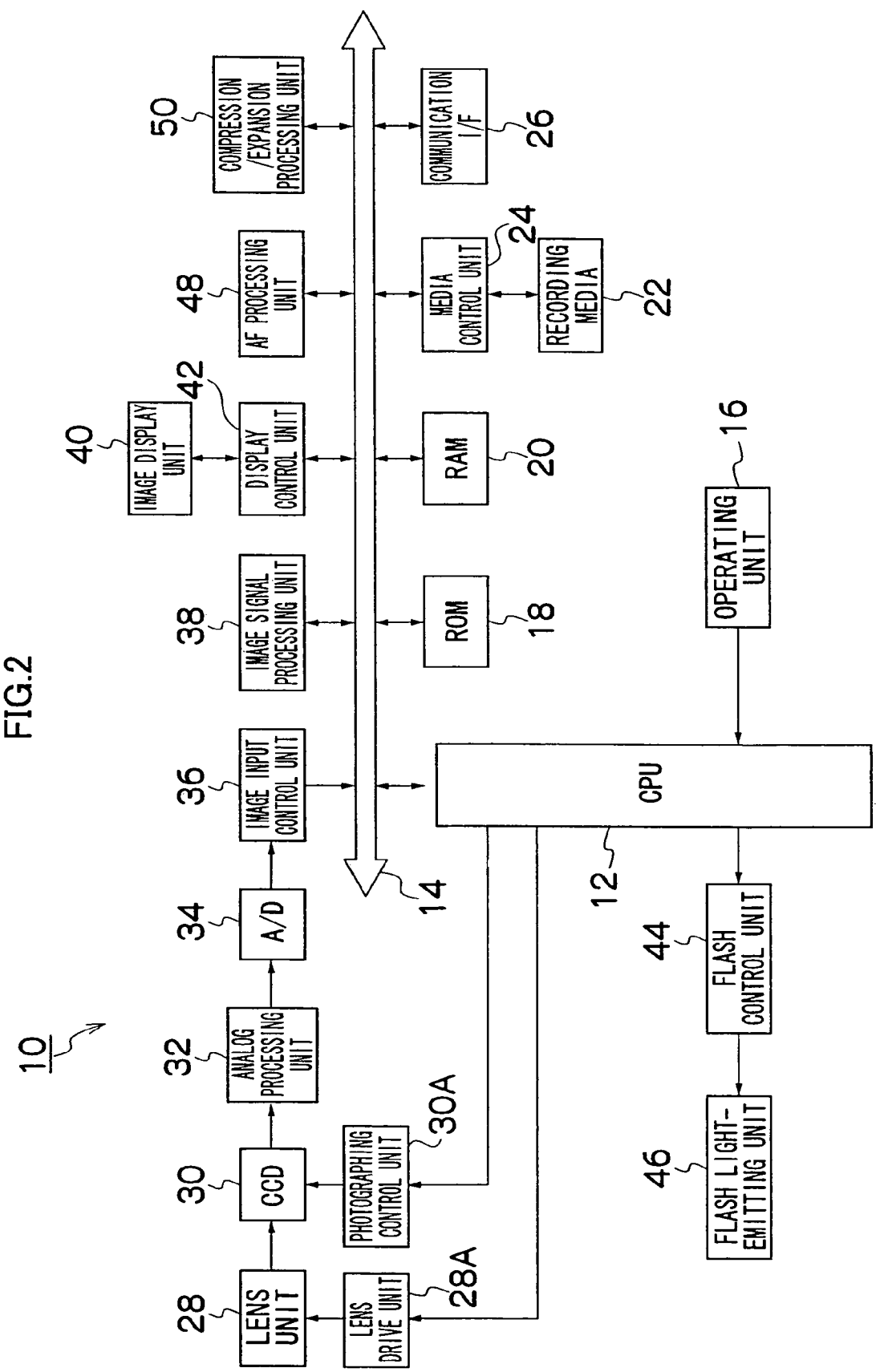
FIG. 2 is a block diagram illustrating a main configuration of a photographing apparatus according to the first embodiment of the present invention.

FIG. 2 is a block diagram illustrating a main configuration of a photographing apparatus according to a first embodiment of the present invention. As shown in FIG. 2, a CPU 12 is connected to respective units in a photographing apparatus 10 (hereinafter referred to as the "camera 10") via a bus 14, and it is an integrated control unit that controls operations of the camera 10 operation based on operation inputs from an operating unit 16, etc. The CPU 12 controls the units in the camera 10 based on input signals from the operating unit 16, and controls, for example, the driving of a lens unit 28, photographing operation, image processing, the recording/replaying of image data, and the displaying of an image display unit 40.

The operating unit 16 includes a power supply switch, an operation mode changeover switch, a photographing mode changeover switch, a face detection function on/off switch, a release button, a menu/OK key, a crosshair key, a cancel key, and a flash button.

The power supply switch is a device for controlling the on-off of power supply to the camera 10.

The operation mode changeover switch is an operation device for switching the operation mode of the camera 10 between photographing mode and replay mode.

The photographing mode changeover switch functions as a switch for switching photographing modes of the camera 10. The photographing mode of the camera 10 can be switched to a scene position mode for performing photographing after the optimization of the focus and exposure according to the scene position (for example, natural photo, human, landscape, sport, night view, in-water, close-up [for flowers, etc.] or texts), an automatic mode in which the focus and exposure are automatically set, a manual mode in which the focus and exposure are manually set, or a moving image photographing mode.

The face detection function on/off switch controls the on-off of a face detection mode in which a face is detected from a taken image.

The release button is an operation button for inputting an instruction to start photographing, and consists of a two step stroke-type switch having an S1 switch to be on at the time of half press, and an S2 switch to be on at the time of full press.

The menu/OK key is an operating key including both a function as a menu button for giving an instruction to display a menu on a screen of the image display unit 40, and a function as an OK button to instruct the determination and execution of the selected content, etc.

The crosshair key is an operating unit for inputting an instruction for a movement in four directions: upward, downward, rightward and leftward, and it functions as a button for selecting an item from a menu screen, or instructing various setting item selections from the menus (a cursor movement operation device). Also, the upward key and the downward key function as a zoom switch in photographing mode or as a replay zoom switch during relaying, and the rightward key and the leftward key function as a frame-by-frame advance (in the forward direction/backward direction) in replay mode.

The cancel key is used for, for example, erasing a desired target such as a selected item or the like, cancelling an instructed content, or returning to the operation state one step before.

The flash button functions as a button for switching flash mode, and the flash mode is set to flash a light-emitting mode or a light-emitting prohibition mode by pressing the flash button in photographing mode.

ROM 18 stores programs processed by the CPU 12 and various data necessary for control, etc. RAM 20 includes a work area in which the CPU 12 performs various kinds of arithmetic processing, etc., and an image processing area.

The camera 10 has a media socket (media loading unit), enabling a recording media 22 to be loaded. The form of the recording media 22 is not specifically limited, and various kinds of media, such as semiconductor memory cards typified by xD Picture Card (trademark) and Smart Media (trademark), portable small hard disks, magnetic disks, optical disks, magneto optical disks, can be used. A media control unit 24 performs a required signal conversion for passing input/output signals suitable for the recording media 22.

Also, the camera 10 includes a communication interface unit (communication I/F) 26 as a communication device for connecting to the Internet or a public line such as a mobile phone communication network, etc.

Photographing Mode

Next, the photographing function of the camera 10 is explained. During photographing mode, an imaging unit including a color CCD solid imaging element 30 (hereinafter referred to as the "CCD 30") is supplied with power, entering the state enabling taking images.

The lens unit 28 is an optical unit including a taking lens that includes a focus lens and a zoom lens, and a diaphragm. A lens drive unit 28A includes a motor for moving the focus lens, the zoom lens and the diaphragm, and a sensor for detecting the positions of the above lenses, etc. The CPU 12 controls the focusing, zooming and diaphragm of the taking lens by outputting control signals to the lens drive unit 28A.

Light passing through the lens unit 28 is imaged on the acceptance surface of the CCD 30. On the acceptance surface of the CCD 30, multiple photodiodes (light-receiving elements) are two-dimensionally arranged, and in each photodiode, color filters of primary colors, i.e., red (R), green (G), and blue (B), are disposed in a predetermined arrangement structure. An image of a subject imaged on the acceptance surface of the CCD 30 is converted by the photodiodes to signal charges in the amount according to the amount of incident light. These signal charges are sequentially read as R, G and B voltage signals (image signals) according to the charge amount. The CCD 30 has an electronic shutter function that controls charge accumulation time (shutter speed) for each of the photodiodes. The CPU 12 controls the timing for reading the signal charges from the CCD 30 and the charge accumulation time for the photodiodes in the CCD 30 via a photographing control unit 30A.

The R, G and B image signals read from the CCD 30 are amplified by being sampled and held (correlation double sampling processing) by an analog processing unit (CDS/AMP) 32 for each pixel of the CCD 30, and then added to an A/D converter 34 and converted to digital signals. The R, G and B signals converted by the A/D converter 34 to digital signals are stored in the RAM 20 via an image input control unit 36.

An image signal processing unit 38 functions as an image processing device including a synchronization circuit (a processing circuit that interpolates spatial skew of color signals accompanying a single-plate CCD color filter arrangement and converts the color signals to be synchronized with each other), a white balance adjustment circuit, a gamma correction circuit, a contour correction circuit, a luminance and color-difference signal generation circuit, and performs predetermined signal processing utilizing the RAM 20 according to instructions from the CPU 12. In other words, the image signal processing unit 38 converts the digital R, G and B signals stored in the RAM 20 to luminance signals (Y signals) and color-difference signals (Cr and Cb signals), and performs predetermined processing, such as gamma correction, on those signals, and then write them back to the RAM 20.

When a taken image is output to the image display unit 40 (for example, a liquid-crystal monitor) for monitoring, the luminance/color-difference signals (Y/C signals) stored in the RAM 20 are read, and sent to a display control unit 42 via the bus 14. The display control unit 42 converts the input Y/C signals to video signals in a predetermined format for display (for example, NTSC (NTSC: National Television System Committee) color composite image signals) and output them to the image display unit 40.

When displaying a live view image (through-the-lens image), the image data in the RAM 20 is periodically rewritten by image signals output from the CCD 30, and image signals generated by the image data are supplied to the image display unit 40. As a result, an image that is being taken (the through-the-lens image) is displayed on the image display unit 40 in real time. A photographer can confirm the field angle for photographing by means of the through-the-lens image displayed on the image display unit 40.

When the release button is pressed halfway (S1 is on), the image signals output from the CCD 30 are input to the CPU 12 via the image input control unit 36 after A/D conversion, and AE (Automatic Exposure) and AF (Automatic Focus) processing is started.

The CPU 12 divides one screen into a plurality of divided areas (for example, 8×8 or 16×16 areas), and integrates R, G and B image signals for each of these divided areas. Then, the CPU 12, based on these integration values, detects the brightness of the subject (subject luminance), calculates an exposure value suitable for photographing (photographing EV value), and determines a diaphragm stop and a shutter speed according to this exposure value and a predetermined program line, and then acquires a proper amount of exposure by controlling the electronic shutter and the diaphragm in the CCD 30.

Furthermore, the CPU 12, when the flash light-emitting mode is set, makes a flash control unit 44 operate by sending a command to it. The flash control unit 44 includes a main condenser for supplying current for making a flash light-emitting unit 46 (discharge tube) emit light, and performs controls including the control of the charging of the main condenser, the control of the timing and the discharge time for discharge (light emission) to the flash light-emitting unit 46, according to flash light emission instructions from the CPU 12. In addition, for the flash light-emitting unit 46, an LED (Light Emitting Diode) can be used instead of the discharge tube.

Furthermore, the CPU 12, during automatic white balance adjustment, calculates an average integration value for each color of the R, G and B image signals for each divided area, obtains the RIG and B/G ratios for each divided area, and determines the light source type based on the distribution of RIG and B/G values in color spaces of the R/G and B/G axis coordinate, and so on. The CPU 12 then controls gain values (white balance gains) for the R, G and B image signals according to the determined light source type to correct the image signals in each of the color channels, i.e., R, G and B.

For AF control in the camera 10, for example, contrast AF that moves the focus lens so that the high-frequency components of the G signal in the image signals become local maximum is employed. In other words, an AF processing unit 48 clips signals within an AF area set in advance in a part of an effective pixel region (for example, a center part of the effective pixel region) in the CCD 30, and lets only the high-frequency components of the G signals in the AF area pass through by means of a highpass filter, and integrates the absolute value data for these high-frequency components, and calculates a focus evaluation value (AF evaluation value) relating to an image of a subject within the AF area.

While controlling the lens drive unit 28A to move the focus lens, the CPU 12 calculates a focus evaluation value at a plurality of AF detection points, and determines, as a focus position, the position of the focus lens in which the focus evaluation value becomes local maximum. Then, the CPU 12 moves the focus lens to the determined focus position by controlling the lens drive unit 28A. The calculation of the focus evaluation value is not limited to the manner that uses G signals, but may use luminance signals (Y signals).

If the release button is fully pressed (S2 is on) after AE/AF processing is performed as a result of the release button being pressed halfway (S1 being on), focusing judgment is performed, and AF control is re-executed as needed, and then a photographing operation for recording starts. Image data acquired in response to S2 being on is converted to luminance/color-difference signals (Y/C signals) in the image signal processing unit 38, is subjected to predetermined processing, such as gamma correction, and then stored in the RAM 20. The details of focusing judgment processing are described later.

The Y/C signals stored in the RAM 20 are compressed in a predetermined format by a compression/expansion processing unit 50, and then it is recorded in the recording media 22 via the media control unit 24. For example, a still image is recorded as a JPEG (Joint Photographic Experts Group) image file, and a moving image is recorded as an AVI (Audio Video Interleaving) or Motion-JPEG image file.

Replay Mode

In replay mode, the compressed data for the last image file recorded in the recording media 22 (last-recorded image file) is read. If the last-recorded image file is a still image, the read compressed data is expanded by the compression/expansion processing unit 50 to non-compressed YC signals, and the YC signals are converted by the image signal processing unit 38 and the display control unit 42 to display signals, and then they are output to the image display unit 40. As a result, the content of the image in the image file is displayed on the image display unit 40.

During replaying one frame in a still image (including the case where the top frame of a moving image is being replayed), the replay-target image file can be switched to another by pressing the rightward key or leftward key in the crosshair key (forward frame advance/backward frame advance). The image file at the position designated by the frame advance is read from the recording media 22, and a still image or a moving image is replayed on the image display unit 40 in a manner similar to the above.

Focusing Control Method

Figure 1:
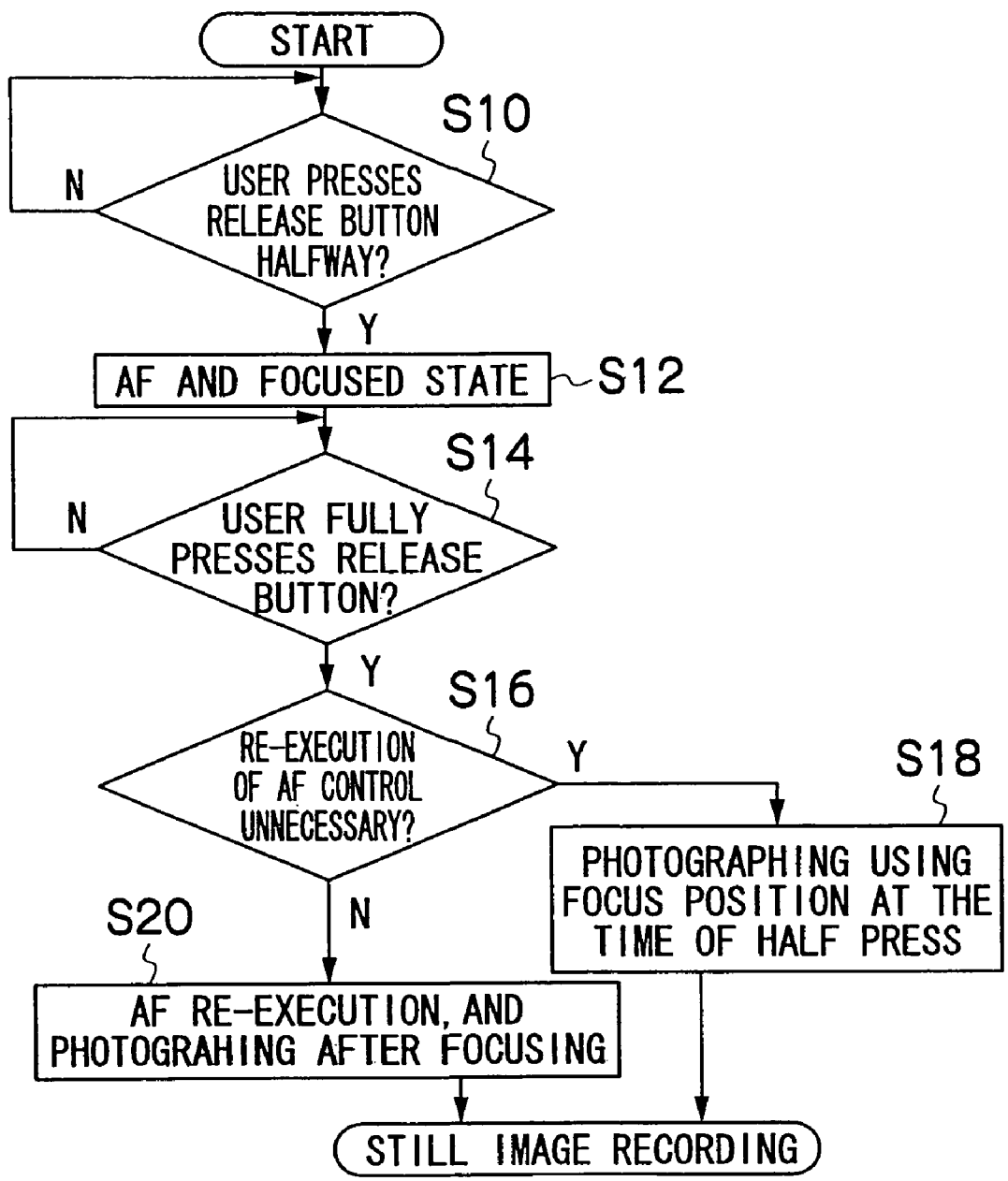
FIG. 1 is a flowchart illustrating a processing flow of a CPU during AF control according to a first embodiment of the present invention.

Next, a focusing control method according to this embodiment is described. FIG. 1 is a flowchart illustrating a processing flow of the CPU 12 during AF control.

First, when a user's half press of the release button (S1 being on) is detected ("Yes" in Step S10), AF control is performed and a subject within an AF area is brought into focus (focused state) (step S12).

Next, when the user's full press of the release button (S2 being on) is detected ("Yes" in step S14), whether or not it is necessary to re-execute AF control is judged (step S16). At step S16, for example, if at least one of the brightness of an image output from the CCD 30, the integration value of the luminance values for each divided area of the image, brightness in the AF area, integration value of luminance values in the AF area, and the field angle is changed by no less than a predetermined value, the re-execution of AF control is judged to be necessary. Also, as a device for detecting a change in the field angle, a configuration including a sensor for detecting the amount of movement from the time of S1 being on till the time of S2 being on in the camera 10 may be employed.

If the re-execution of AF control is judged to be not necessary at step S16, photographing is performed using the focus position at the time of the half press at step S12 as it is (step S18), and a still image is recorded in the recording media 22. Meanwhile, if the re-execution of AF control is judged to be necessary at step S16 ("No" in step S16), AF control is re-executed, and photographing is performed after performing focusing on the AF area (step S20), and a still image is recorded in the recording media 22.

According to this embodiment, if a particular subject moves after the particular subject is brought into focus at the time of S1 being on, it is possible to perform photographing after performing AF control so that the particular subject is in focus at the time of S2 being on.

Also, in this embodiment, a device for moving an AF area may be provided so that when a subject moves to the outside of the AF area after S1 being on, the AF area can be moved so as to include the subject therein. Furthermore, a device for detecting a particular target (for example, a human face, an animal, a car, or a subject registered in advance in the camera 10, etc.) may be provided so that the AF area follows the particular target.

Second Embodiment

Figure 3:
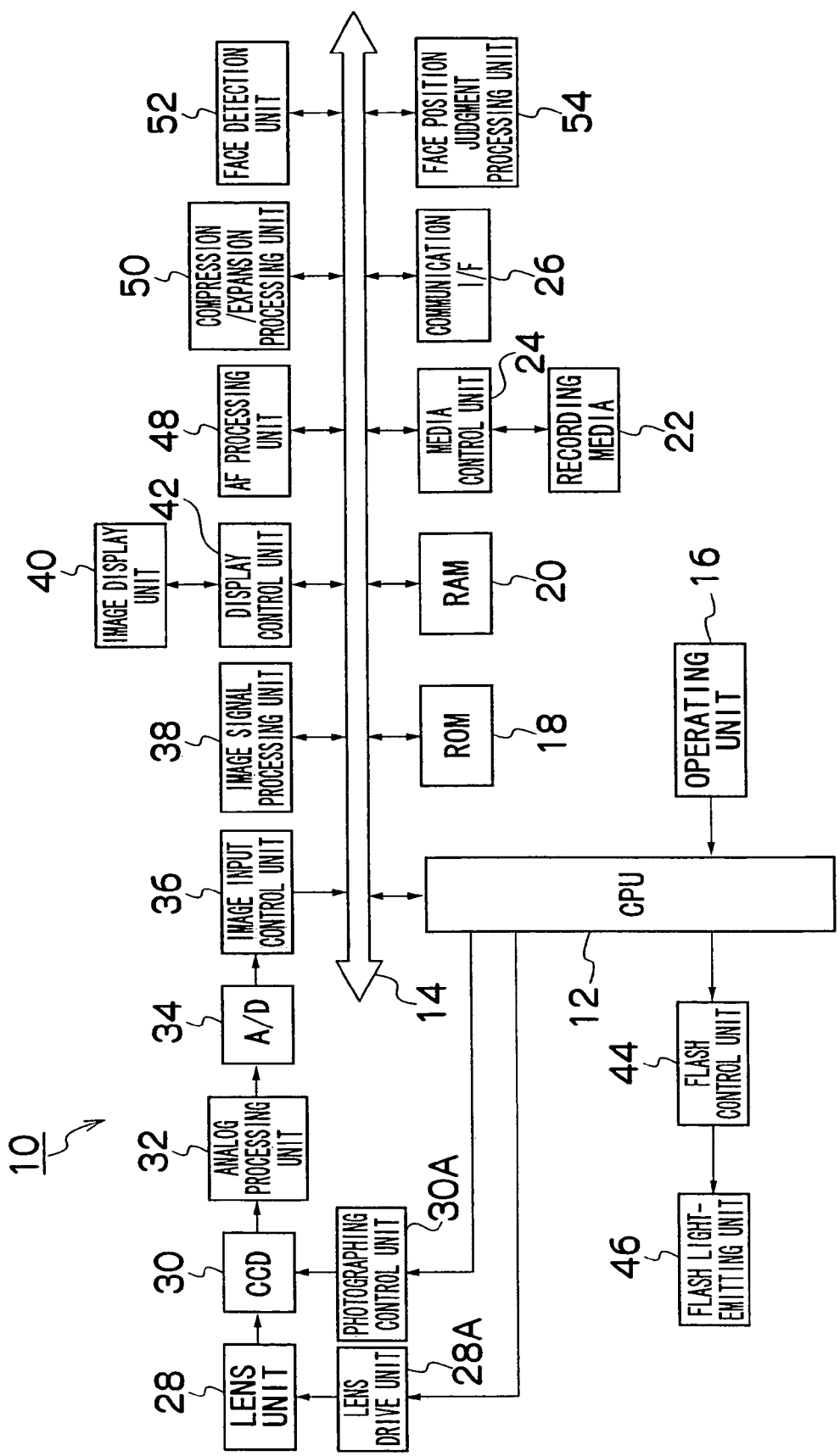
FIG. 3 is a block diagram illustrating a main configuration of a photographing apparatus according to a second embodiment of the present invention.

Next, a second embodiment of the present invention is described. FIG. 3 is a block diagram illustrating a main configuration of a photographing apparatus according to the second embodiment of the present invention. In the descriptions below, the components similar to those in the first embodiment are provided with the same reference numerals, and the explanations thereof are omitted. As shown in FIG. 3, the camera 10 according to this embodiment further includes a face detection unit 52, and a face position judgment processing unit 54.

The face detection unit 52, when the photographing mode is set to pre-shutter mode, performs face detection processing on through-the-lens image data (live view image data) output from the CCD 30 to detect a face region including the image of a subject's face from the through-the-lens image data. Here, as a face region detection processing method, for example, there is a method in which pixels having colors close to the color designated as the flesh color are extracted from the original image and the extracted region is detected as a face region. The above processing is performed by, for example, determining the range of the flesh color in a color space for distinguishing the flesh color from the other colors, from information on the flesh color sampled in advance, and judging whether or not the color of each pixel is within the determined range. A method other than the above method may be used for the face region detection processing method.

The face position judgment processing unit 54 judges whether or not the distance between the face regions detected at the time of the half press (S1 being on) and at the time of the full press (S2 being on) of the release button is no less than a predetermined value. Here, the distance between the face regions is, for example, the distance between the center points of the face regions detected at the time of S1 being on and at the time of S2 being on, or the distance between predetermined edge portions of the face regions (for example, when the face regions are rectangular, a predetermined point from among the four corner points in each face region, e.g., the upper left points). If the distance between the face regions at the time of S1 being on and at the time of S2 being on is no less than the predetermined value, photographing is performed after AF control is performed to focus on the face in the face region detected at the time of S2 being on. Meanwhile, if the distance between the face regions is less than the predetermined value, photographing is performed using the focus position at the time of S1 being on as it is.

FIGS. 4A to 4D are diagrams for explaining a focusing control method according to this embodiment. A reference numeral F10 in FIGS. 4A to 4D designates an AF frame indicating an AF area in the image display unit 40 during the display of a through-the-lens image, and a reference numeral F12 designates a face detection frame displayed in a face region in the image display unit 40 during face detection. In FIGS. 4A to 4D, the contours of the subjects that are in focus are indicated by solid lines, and the contours of the subjects that are out of focus (not in focus) are indicated by dashed lines.

Figure 4B:
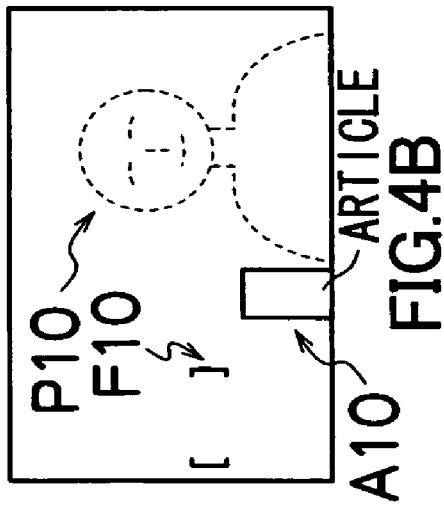
FIGS. 4A to 4D are diagrams for explaining a focusing control method according to the second embodiment of the present invention.
Figure 4D:
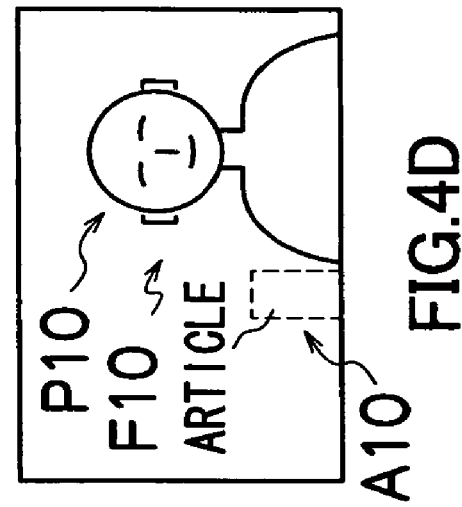
Figure 4A:
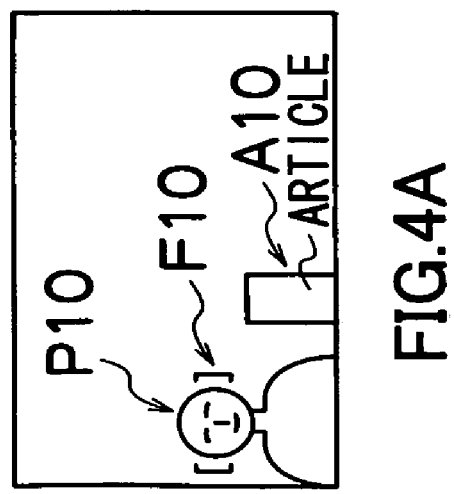

As shown in FIG. 4A, when the release button is pressed halfway (S1 is on), face detection processing is performed by the face detection unit 52, and AF control is performed so that a detected face F10 is in focus. In FIG. 4A, while the detected face P10 is in focus, an article A10 just beside the face P10 (i.e., an article in a position whose distance from the camera 10 is the same as the distance from the camera 10 to the face P10) is also in focus.

As shown in FIG. 4B, when the distance between the camera 10 and the face P10 has changed as a result of the face P10 moving after the end of AF control, the focus position is not changed, so the article A10 is still in focus, but the face P10 becomes out of focus.

Figure 4C:
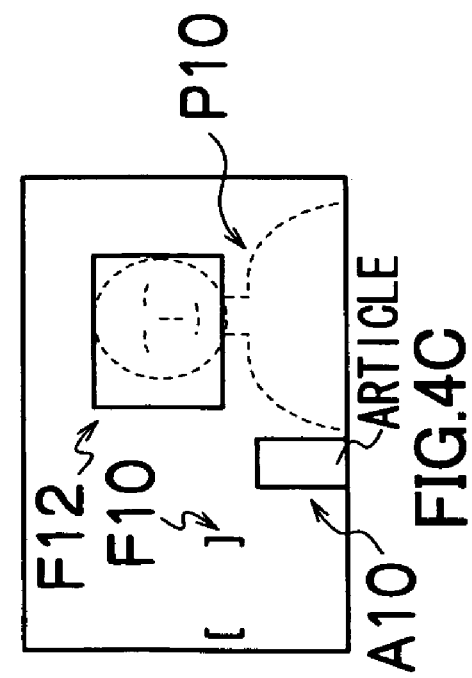

As shown in FIG. 4C, the processing for detecting the face P10 is repeatedly performed at predetermined time intervals, the face detection frame F12 moves accompanying the face P10 movement. As shown in FIG. 4D, if the face P10 has moved from its position at the time of S1 being on when the release button is fully pressed (S2 is on), the AF frame F10 moves to the position of the face P10, and AF control is performed so that the face P10 is in focus, and then an image is photographed. In FIG. 4D, the face P10 is in focus, while the article A10 is out of focus.

Next, a focusing control method according to this embodiment is described. FIG. 5 is a flowchart illustrating a processing flow of the CPU 12 during AF control. First, when the face detection mode is set to be on, face detection processing is executed by the face detection unit 52 (step S30). Then, if a user's half press of the release button (S1 being on) is detected ("Yes" in step S32), then, whether or not a face, that is, a face region is detected from an image in through-the-lens image (live view image) being taken is judged (step S34). In other words, when the release button is pressed halfway, it is judged whether or not a face region is detected in an image taken at the time of the half press of the release button during live view display.

If a face is detected at step S34, AF control is performed so that the detected face in the face region is in-focus (step S36). During the time from the end of AF control at step S36 until the detection of full press of the release button (S2 being on), the face detection processing is repeatedly performed (step S38). Then, when the user's full press of the release button (S2 being on) is detected ("Yes" in step S40), then, whether or not a face is detected from the image in through-the-lens image (live view image) being taken (step S42) is judged. In other words, when the release button is fully pressed, it is judged whether or not a face region is detected in an image taken at the time of the full press of the release button during live view display. If no face is detected at step S42, the AF area is set in the center part of the image, and an image is photographed after performing AF control so that a subject in the AF area is in focus (step S44), and the photographed image is recorded in the recording media 22.

Meanwhile, if a face is detected at step S42, then, whether or not the face position, that is, the position of the face region detected at the time of the half press (S1 being on) and the position of the face region detected at the time of the full press (S2 being on) of the release button are separated from each other by no less than a predetermined value is judged (step S46). If the distance between the face region detected at the time of the half press (S1 being on) and the face region detected at the time of the full press (S2 being on) of the release button is no less than the predetermined value ("Yes" in step S46), an image is photographed after performing AF control so that the face detected at the time of the full press (S2 being on) is in focus (step S48), and the photographed image is recorded in the recording media 22.

Meanwhile, if the distance between the face region detected at the time of the half press (S1 being on) and the face region detected at the time of the full press (S2 being on) of the release button is less than the predetermined value ("No" in step S46), an image is photographed using the focus position at the time of the half press (S1 being on) as it is (step S50), and the photographed image is recorded in the recording media 22.

If no face is detected at step S34, the AF area is set in the center part of the image, and AF control is performed so that a subject in the AF area is in-focus (step S52). During the time from the end of AF control at step S52 until the detection of full press (S2 being on) of the release button, the face detection processing is repeatedly performed (step S54). Then, if the users full press of the release button (S2 being on) is detected ("Yes" in step S56), then, whether or not a face is detected from an image in through-the-lens image being taken (step S58) is judged. If no face is detected at step S58, the AF area is set in the center part of the image, and the image is photographed after performing AF control so that a subject in the AF area is in focus (step S44), and the photographed image is recorded in the recording media 22.

Meanwhile, if a face is detected at step S58, the image is photographed after performing AF control so that the face detected at the time of the full press (S2 being on) is in focus (step S60), and the photographed image is recorded in the recording media 22.

According to this embodiment, even though a face moves after focusing on the face detected at the time of S1 being on in face detection mode, photographing can be performed after performing AF control so that the face is in focus at the time of S2 being on.

Also, in this embodiment, face detection is repeatedly performed during half press of the release button, however, for example, face detection, AF control and photographing processing may be all performed at the time of full press of the release button (S2 being on).

Furthermore, although, in this embodiment, AF processing is performed based on the face position at the time of S2 being on, AF processing may be repeatedly performed based on the face positions during the time from S1 being on till S2 being on.

Third Embodiment

Figure 6:
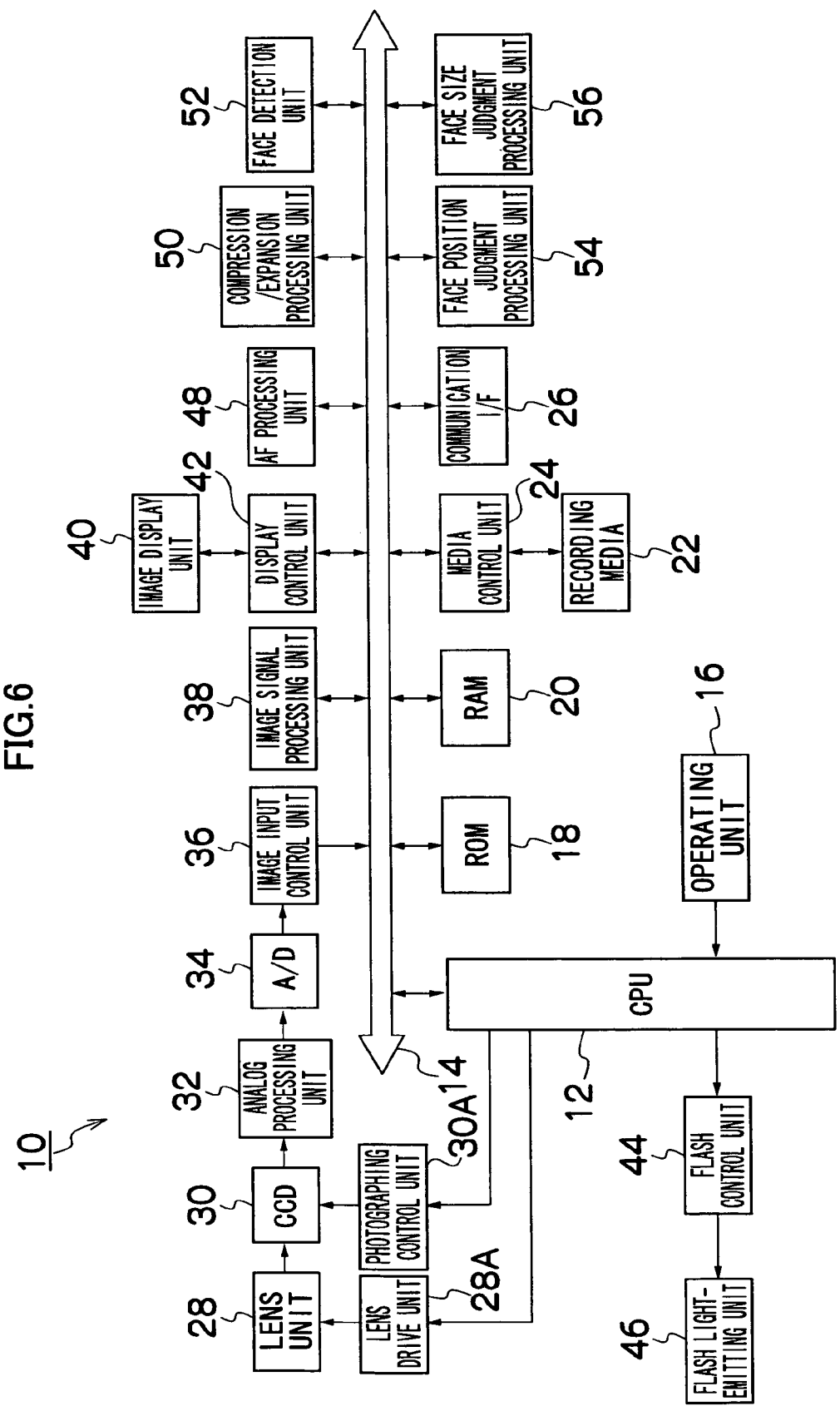
FIG. 6 is a block diagram illustrating a main configuration of a photographing apparatus according to a third embodiment of the present invention.

Next, a third embodiment according to the present invention is described. FIG. 6 is a block diagram illustrating a main configuration of a photographing apparatus according to the third embodiment of the present invention. In the descriptions below, the components similar to those in the first and second embodiments above are provided with the same reference numerals, and the explanations thereof are omitted. As shown in FIG. 6, the camera 10 according this embodiment further includes a face size judgment processing unit 56.

The face position judgment processing unit 54 judges whether or not the distance between the face regions detected at the time of the half press (S1 being on) and at the time of the full press (S2 being on) of the release button is no less than a predetermined value. Here, the distance between the face regions is the distance between predetermined edge portions of the face regions (for example, when the face regions are rectangular, a predetermined point from among the four corner points in each face region, e.g., the upper left points).

The face size judgment processing unit 56 judges whether or not a difference between the size (dimension) of the face region detected at the time of the full press of the release button (S2 being on) and the size of the face region detected at the time of the half press (S1 being on) is no less than a predetermined value. Here, if the size difference, that is, the amount of change in size between the face region at the time of S1 being on and the face region at the time of S2 being on is no less than the predetermined value, photographing is performed after AF control is performed so that the face region detected at the time of S2 being on is in focus. Meanwhile, if the amount of change in the face region size is less than the predetermined value, photographing is performed using the focus position at the time of S1 being on as it is. Whether or not the face region sizes are different from each other may be judged based on, for example, the area of the face detection frame, or may also be judged based on the distance between the upper and lower edge portions or the right and left edge portions of the face detection frame.

FIGS. 7A to 7D are diagrams for explaining a focusing control method according to this embodiment. Reference numeral F10 in FIGS. 7A to 7D designates an AF frame indicating an AF area in the image display unit 40 when through-the-lens image is displayed, that is, during live view image display. And, reference numeral F12 designates a face detection frame displayed in a face region on the image display unit 40 during face detection.

Figure 7B:
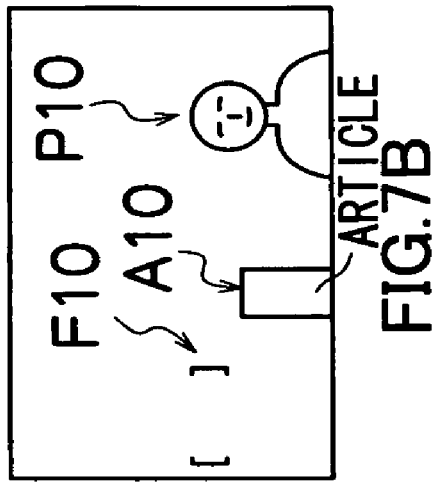
FIGS. 7A to 7D are diagrams for explaining a focusing control method according to the third embodiment of the present invention.
Figure 7D:
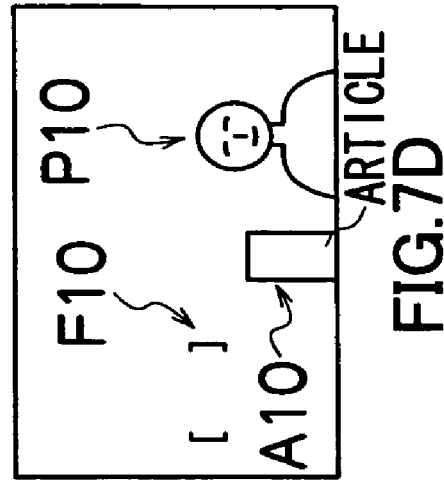
Figure 7A:
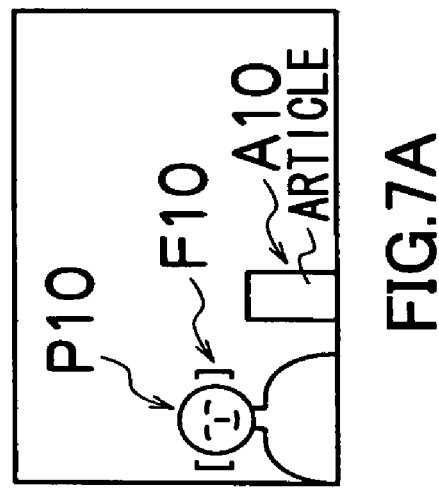

As shown in FIG. 7A, when the release button is pressed halfway (S1 being on), face detection processing is performed by the face detection unit 52, and AF control is performed so that a detected face P10 is in focus. In FIG. 7A, while the detected face P10 is in focus, and an article A10 just beside the face P10 (i.e., an article in a position whose distance from the camera 10 is the same as the distance from the camera 10 to the face P10) is also in focus.

Figure 7C:
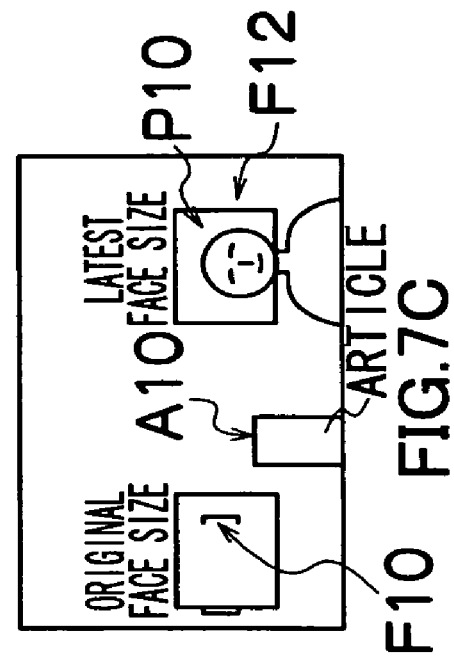

The processing for detecting the face P10 is repeatedly performed at predetermined intervals, and when the face P10 has moved after the end of AF control as shown in FIG. 7B, the face detection frame F12 moves accompanying the face P10 movement as shown in FIG. 7C.

If the face P10 has moved from the position at the time of S1 being on when the release button is fully pressed (S2 being on), the size of the face region including the face P10 is measured. As shown in FIG. 7D, the size of the face regions has not changed between the time of S1 being on and the time of S2 being on, photographing is performed using the focus position at the time of S1 being on as it is.

Figure 8:
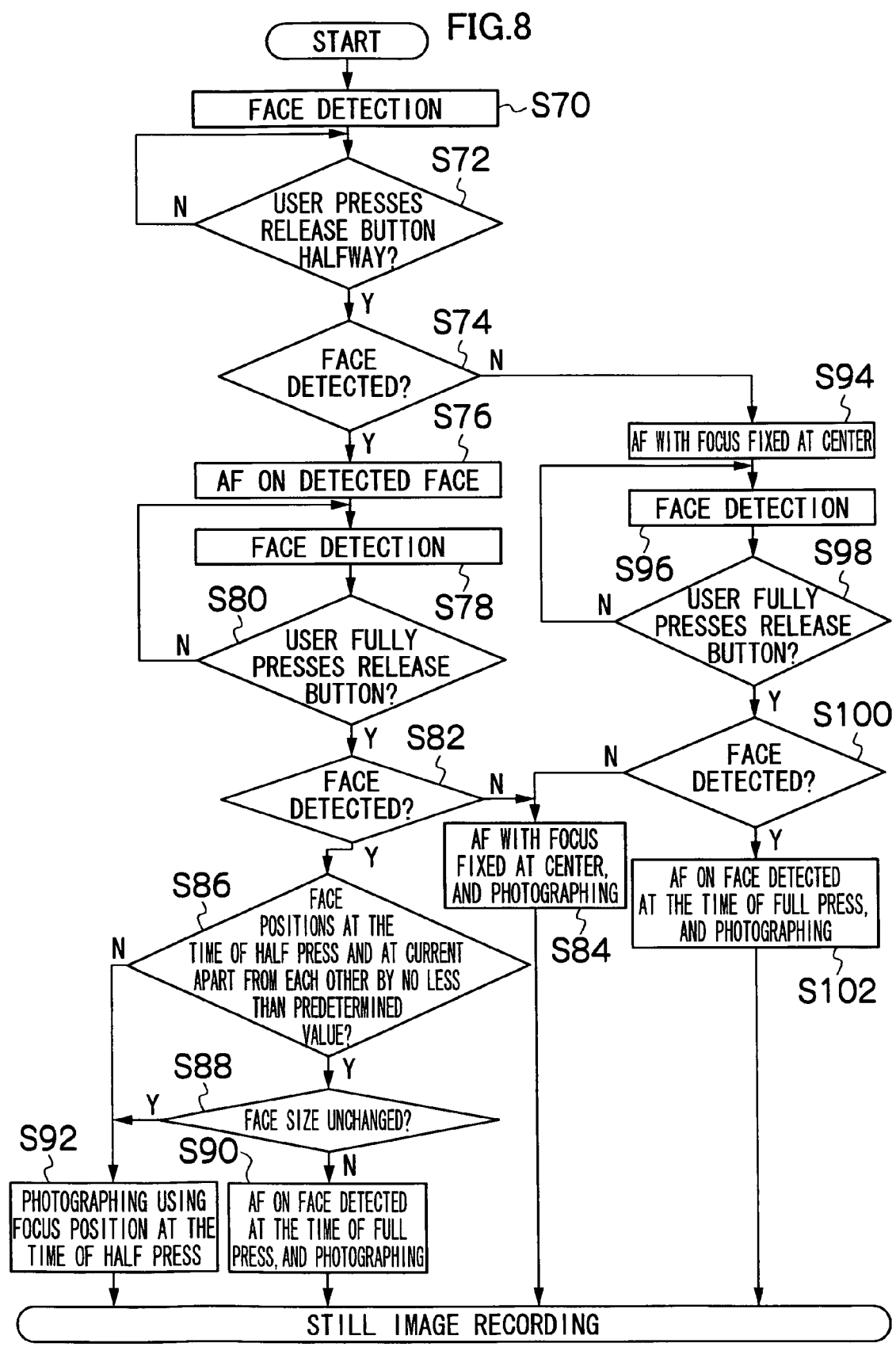
FIG. 8 is a flowchart illustrating a processing flow of a CPU during AF control according to the third embodiment of the present invention.

Next, a focusing control method according to this embodiment is described. FIG. 8 is a flowchart of a processing flow of the CPU 12 during AF control. First, when the face detection mode is set to be on, face detection processing is executed by the face detection unit 52 (step S70). If a user's half press of the release button (S1 being on) is detected ("Yes" in step S72), then, whether or not a face, that is, a face region is detected from an image in through-the-lens image being taken is judged (step S74). In other words, when the release button is pressed halfway, it is judged whether or not a face region is detected in an image taken at the time of the half press of the release button during live view display.

If a face is detected at step S74, AF control is performed so that the detected face is in focus (step S76). During the time from the end of AF control at step S76 until the detection of full press of the release button (S2 being on), the face detection processing is repeatedly performed (step S78). Subsequently, when the user's full press of the release button (S2 being on) is detected ("Yes" in step S80), then, whether or not a face is detected from an image in through-the-lens image being taken is judged (step S82). In other words, when the release button is fully pressed, it is judged whether or not a face region is detected in an image taken at the time of the full press of the release button during live view display. If no face is detected at step S82, an AF area is set in the center part of the image, and the image is photographed after AF control is performed so that a subject in the AF area is in focus (step S84), and the photographed image is recorded in the recording media 22.

Meanwhile, if a face is detected at step S82, then, whether or not the face position, that is, the position of the face region detected at the time of the half press (S1 being on) and that detected at the time of the full press (S2 being on) of the release button are separated from each other by no less than a predetermined value is judged (step S86). If the distance between the face region detected at the time of the half press (S1 being on) and that detected at the time of the full press (S2 being on) of the release button is no less than the predetermined value ("Yes" at step S86), then, whether or not a difference in the face size, that is, the size of the face region between at the time of S1 being on and at the time of S2 being on is no less than a predetermined value is judged (step S88). If the face size is different between at the time of S1 being on and at the time of S2 being on, by no less than the predetermined value ("No" in step S88), an image is photographed after performing AF control so that the face detected at the time of the full press (S2 being on) is in focus (step S90), and the photographed image is recorded in the recording media 22.

Meanwhile, when the distance between the position of the face region detected at the time of the half press (S1 being on) and that detected at the time of the full press (S2 being on) of the release button is less than the predetermined value ("No" in step S86), if the face size is not different between at the time of S1 being on and at the time of S2 being on, by no less than the predetermined value ("Yes" in step S88), an image is photographed using the focus position at the time of the half press (S1 being on) as it is (step S92), and the photographed image is recorded in the recording media 22.

If no face is detected at step S74, an AF area is set in the center part of the image, and AF control is performed so that a subject within the AF area is in focus (step S94). During the time from the end of AF control at step S94 until the detection of the full press of the release button (S2 being on), the face detection processing is repeatedly performed (step S96). Subsequently, if the user's full press of the release button (S2 being on) is detected ("Yes" in step S98), then, whether or not a face is detected from an image in through-the-lens image being taken is judged (step S100). In other words, when the release button is fully pressed, it is judged whether or not a face region is detected in an image taken at the time of the full press of the release button during live view display. If no face is detected at step S100, an AF area is set in the center part of the image, and the image is photographed after AF control is performed so that a subject in the AF area is in focus (step S84), and the photographed image is recorded in the recording media 22.

Meanwhile, if a face is detected at step S100, an image is photographed after performing AF control so that the face detected at the time of the full press (S2 being on) is in focus (step S102), and the photographed image is recorded in the recording media 22.

According to this embodiment, even through a face has moved after focusing on the face detected at the time of S1 being on in face detection mode, photographing can be performed after performing AF control so that the face detected at the time of S2 being on is in focus.

Also, although, in this embodiment, the face size, that is, the size of the face region is judged when the face positions at the time of S1 being on and at the time of S2 being on are different from each other, by no less than the predetermined value, the difference of face size may always be judged, omitting the face position judging step.

Furthermore, although, in this embodiment, AF processing is performed based on the face size judgment at the time of S2 being on, AF processing based on the face size judgment may be repeatedly performed from the time of S1 being on till the time of S2 being on.

The photographing apparatus and focusing control method according to the embodiments of the present invention can also be achieved by employing a program that makes a computer perform the above-described processing in a computer including a photographing device.

What is claimed is:

1. A photographing apparatus comprising:
a photographing device which takes an image of a subject;
a face detection device which detects a face region including a face of the subject from the image taken by the photographing device;
a focusing instruction device for inputting a focusing instruction;
a focusing control device which, upon the input of the focusing instruction, performs focusing control to focus on the face in the face region detected by the face detection device;
a photographing instruction device for inputting a photographing instruction to the photographing device after the input of the focusing instruction;
a face size judgment device which judges whether or not a difference between a size of a face region at the time of the input of the focusing instruction and a size of a face region at the time of an input of the photographing instruction is no less than a predetermined value, the face regions are detected by the face detection device; and
a photographing control device which controls to execute photographing using a focus position at the time of the input of the focusing instruction as it is if the difference is judged to be less than the predetermined value, and controls to execute photographing after performing focusing control to focus on a face in the face region detected at the time of inputting the photographing instruction if the difference is judged to be no less than the predetermined value.

2. A focusing control method comprising:
a focusing instruction step for inputting a focusing instruction;
a first face detection step of, upon an input of the focusing instruction, detecting a first face region including a face of a subject from an image taken by an image taking device at the time;
a focusing control step of, upon the input of the focusing instruction, performing focusing control to focus on the face in the first face region detected by the first face detection step;

a photographing instruction step for inputting a photographing instruction after the input of the focusing instruction;

a second face detection step of, upon an input of the photographing instruction, detecting a second face region including a face of the subject from an image taken by the image taking device at the time;

a face size judgment step of, upon the input of the photographing instruction, judging whether or not a difference between a size of the first face region and a size of the second face region is no less than a predetermined value; and a photographing control step of executing photographing using a focus position at the time of the input of the focusing instruction as it is if the difference is judged to be less than the predetermined value, and executing photographing after performing focusing control to focus on a face in the face region detected at the time of inputting the photographing instruction if the difference is judged to be no less than the predetermined value.

* * * * *